(12) United States Patent
Edvardsson et al.

(10) Patent No.: US 8,730,093 B2
(45) Date of Patent: May 20, 2014

(54) MFPW RADAR LEVEL GAUGING WITH DISTANCE APPROXIMATION

(75) Inventors: Olov Edvardsson, Linköping (SE); Anders Jirskog, Huskvarna (SE)

(73) Assignee: Rosemount Tank Radar AB, Goteborg (SE)

( * ) Notice: Subject to any disclaimer, the term of this patent is extended or adjusted under 35 U.S.C. 154(b) by 343 days.

(21) Appl. No.: 13/246,265

(22) Filed: Sep. 27, 2011

(65) Prior Publication Data

US 2013/0076560 A1    Mar. 28, 2013

(51) Int. Cl.
*G01S 13/08* (2006.01)

(52) U.S. Cl.
USPC .......................................... 342/124; 342/118

(58) Field of Classification Search
CPC ...... G01F 23/284; G01S 13/88; G01S 13/103; G01S 7/4004; H01Q 1/225
USPC ................................................. 342/118, 124
See application file for complete search history.

(56) References Cited

U.S. PATENT DOCUMENTS

| | | | |
|---|---|---|---|
| 3,216,010 A | 11/1965 | Roeschke | ....................... 343/12 |
| 3,623,097 A | 11/1971 | Femenias | |
| 3,725,924 A | 4/1973 | Easton | |
| 4,293,934 A | 10/1981 | Herolz et al. | |
| 4,661,817 A * | 4/1987 | Bekkadal et al. | ............. 342/124 |
| 4,914,441 A | 4/1990 | Brookner | |
| 5,130,714 A | 7/1992 | Taylor | |
| 5,406,842 A * | 4/1995 | Locke | .......................... 73/290 R |
| 5,440,310 A | 8/1995 | Schreiner | ...................... 342/124 |
| 5,504,490 A * | 4/1996 | Brendle et al. | ................. 342/118 |
| 5,546,088 A | 8/1996 | Trummer et al. | ............. 342/124 |
| 6,137,438 A * | 10/2000 | McEwan | ....................... 342/134 |
| 6,415,660 B1 * | 7/2002 | Sinz et al. | .................... 73/290 R |
| 6,642,884 B2 | 11/2003 | Bryant et al. | |
| 6,680,690 B1 | 1/2004 | Nilsson et al. | |
| 7,230,980 B2 | 6/2007 | Langford et al. | |
| 7,482,818 B2 | 1/2009 | Greenwald et al. | |
| 2002/0020216 A1 * | 2/2002 | Schultheiss | ................. 73/290 V |
| 2006/0012512 A1 | 1/2006 | Jirskog | |

(Continued)

FOREIGN PATENT DOCUMENTS

DE   10 2005 057 094 A1   6/2007
EP       1 069 438 A1   1/2001

(Continued)

OTHER PUBLICATIONS

International Search Report for PCT Application No. PCT/EP2011/066896, dated Jun. 5, 2012, 4 pages.

(Continued)

*Primary Examiner* — John B Sotomayor
*Assistant Examiner* — Marcus Windrich
(74) *Attorney, Agent, or Firm* — Westman, Champlin & Koehler

(57) ABSTRACT

Level gauging including an approximation of a distance to the surface of a product kept in a tank. The approximation is determined by relating an amplitude of a first harmonic of an IF signal with an amplitude of a second harmonic of the IF signal.
Basically, each harmonics represents a given distance range. By determining the received power in two or more harmonics, and correlating them to each other, the distance may be estimated. Depending on modulation and other parameters the distance dependence may be very different, and may be selected to suit the application.

26 Claims, 4 Drawing Sheets

(56) References Cited

U.S. PATENT DOCUMENTS

| | | |
|---|---|---|
| 2007/0186678 A1 | 8/2007 | Griessbaum et al. ........... 73/861 |
| 2008/0105048 A1 | 5/2008 | Nilsson et al. |
| 2008/0143583 A1* | 6/2008 | Welle et al. ................... 342/124 |
| 2010/0067570 A1 | 3/2010 | Lipp |
| 2011/0161019 A1* | 6/2011 | Mayer ............................. 702/55 |
| 2012/0169528 A1 | 7/2012 | Edvardsson et al. |
| 2013/0076559 A1 | 3/2013 | Edvardsson et al. |

FOREIGN PATENT DOCUMENTS

| | | |
|---|---|---|
| EP | 2166671 A2 | 3/2010 |
| GB | 2123237 | 6/1982 |
| JP | 2004301617 | 10/2004 |
| WO | WO 00/73747 A1 | 12/2000 |
| WO | WO 01/46653 | 6/2001 |

OTHER PUBLICATIONS

Written Opinion for International Search Report for PCT Application No. PCT/EP2011/066896, dated Jun. 5, 2012, 9 pages.

Stuchly et al., "Microwave Surface Level Monitor", IEEE Transactions on Industrial Electronics and Control Instrumentation, vol. IECI-18, No. 3, Aug. 1971, 8 pages.

Merrill Skolnik, "Introduction to Radar Systems, passage", Introduction to Radar Systems (Second Edition), McGraw-Hill, SG, pp. 88-91, XP002548186, Jan. 1, 1980, ISBN: 978-0-07-057909-5, 4 pages.

Saunders, W.K., "Post-War Developments in Continuous-Wave and Frequency-Modulated Radar", IRE Transactions on Aeronautical and Navigational Electronics, IEEE, USA, vol. ANE-2, No. 1, Mar. 1, 1961, pp. 7-19, XP011245965, ISSN: 0096-1639, 14 pages.

International Search Report for PCT Application No. PCT/EP2011/066875, dated Jun. 1, 2012, 4 pages.

Written Opinion for International Search Report for PCT Application No. PCT/EP2011/066875, dated Jun. 1, 2012, 10 pages.

International Search Report for PCT Application No. PCT/EP2011/074207, dated Apr. 2, 2012, 4 pages.

Written Opinion for International Search Report for PCT Application No. PCT/EP2011/074207, dated Apr. 2, 2012, 8 pages.

"Microwave Surface Level Monitor"; Stuchly et al., IEEE Transactions on Industrial Electronics and Control Instrumentation, vol. IECI-18, No. 3, Aug. 1971, pp. 85-92, 8 total pages.

\* cited by examiner

`US 8,730,093 B2`

MFPW RADAR LEVEL GAUGING WITH DISTANCE APPROXIMATION

FIELD OF THE INVENTION

The present invention relates to a radar level gauge using electromagnetic waves to determine a distance to a surface of a product in a tank.

BACKGROUND OF THE INVENTION

Since the radar level gauging was developed as a commercial product in the 1970's and 1980's, frequency modulated continuous wave (FMCW) has been the dominating measuring principle for high accuracy applications. An FMCW measurement comprises transmitting into the tank a signal which is swept over a frequency range in the order of a few GHz. For example, the signal can be in the range 25-27 GHz, or 9.5-11 GHz. The transmitted signal is reflected by the surface of the contents in the tank (or by any other impedance transition) and an echo signal, which has been delayed a certain time, is returned to the gauge. The echo signal is mixed with the transmitted signal to generate a mixer signal, having a frequency equal to the frequency change of the transmitted signal that has taken place during the time delay. Due to the linear sweep, this difference frequency, also referred to as an intermediate frequency (IF), is proportional to the distance to the reflecting surface. The mixer signal is often referred to as an IF signal.

Although highly accurate, present FMCW systems are relatively power hungry, making them less suitable for applications where power is limited. Examples of such applications include field devices powered by a two-wire interface, such as a 4-20 mA loop, and wireless devices powered by an internal power source (e.g. a battery or a solar cell). Various methods are available to decrease power consumption.

In U.S. Ser. No. 12/981,995, by the same inventor, a novel and less power hungry measuring principle was introduced, involving emitting a series of pulses having constant carrier wave frequency, each pulse being long compared to the time of transit (e.g. a pulse duration in the order of 10 us to 100 ms, compared to time of transit in the order of tenths of a μs). The method is therefore referred to as a Multiple Frequency Pulsed Wave (MFPW).

The number of different carrier wave frequencies in a measurement cycle is insufficient to provide a continuous IF signal, or even an approximation of the IF frequency in the way done in so called "stepped" or "discrete" FMCW system. Instead, the small set of frequencies is chosen according to a specified frequency scheme, and a phase shift in the received pulse is determined for each frequency.

The process of determining the distance to the surface involves establishing a change of phase with emitted frequency (see FIG. 1). The line A represents an initial distance estimation, while line B represents an updated estimation. In theory, only two values (points x) are required to determine the rate of change (slope of line B), while in practice a larger number, e.g. a 5-20 samples, may be required. During a more complicated echo situation or during start-up a few hundred may be required. Naturally, from a power economy point of view, it is desirable to provide high accuracy and reliability with as few samples as possible.

One way to increase accuracy without requiring many samples is to determine a "rough approximation" of the distance to the surface, and to use this estimate as a starting point when determining an accurate distance measure.

General Disclosure of the Invention

Based on the above, it is an object of the present invention to provide an improved radar level gauging system of the kind with pulses of constant frequency which are long compared to the time of transit, which system is capable to provide a rough distance estimate independently of the existing measurement.

According to a first aspect of the present invention, this and other objects are achieved by a method for determining a distance to a surface of a product kept in a tank, the method comprising forming a transmit signal as a pulse train of distinct carrier wave pulses having a duration greater than 1 microsecond and shorter than 100 milliseconds, each pulse being frequency modulated around a defined center frequency, transmitting the transmit signal towards the surface, receiving an electromagnetic return signal reflected at the surface, mixing the return signal with the transmit signal in a first channel (I-channel) and mixing the return signal with a 90° phase shifted transmit signal in a second channel (Q-channel), to provide two IF (intermediate frequency) signals, filtering the IF signals to provide a filtered signal corresponding to a first selected harmonic of the modulation frequency, mixing the filtered signals of each channel with the first selected harmonic of the modulation frequency, to provide two primary amplitude values (I and Q), calculating (step S5) actual phase properties of each distinct pulse received in relation to each corresponding distinct pulse transmitted, based on the primary amplitude values and determining a distance measure based on the actual phase properties, filtering the IF signals to provide a filtered signal corresponding to a second selected harmonic of the modulation frequency, mixing the filtered signals of each channel with the second selected harmonic of the modulation frequency, to provide two secondary amplitude values (I and Q), and providing an approximation of the distance based on a relationship between the primary and the secondary amplitude values.

According to a second aspect of the present invention, this and other objects are achieved by a radar level gauging system, for determining a distance to a surface of a product kept in a tank, the system comprising a transceiver for transmitting electromagnetic transmit signals formed by a pulse train of distinct carrier wave pulses having a duration greater than 1 microsecond and shorter than 100 milliseconds, each pulse being frequency modulated around a defined center frequency, and receiving electromagnetic return signals reflected at the surface, a set of RF mixers for mixing the return signal with the transmit signal in a first channel (I-channel) and mixing the return signal with a 90° phase shifted transmit signal in a second channel (O-channel), to provide two IF (intermediate frequency) signals, a first set of filters for filtering the IF signals to provide a filtered signal corresponding to a first selected harmonic of the modulation frequency, a first set of IF mixers for mixing the filtered signals of each channel with the first selected harmonic of the modulation frequency, to provide two primary amplitude values (1 and Q), a second set of filters for filtering the IF signals to provide a filtered signal corresponding to a second selected harmonic of the modulation frequency, a second set of IF mixers for mixing the filtered signals of each channel with the second selected harmonic of the modulation frequency, to provide two secondary amplitude values (I and Q), and processing circuitry connected to receive outputs from the IF mixers and operable to calculate actual phase properties of each distinct pulse received in relation to each corresponding distinct pulse transmitted, based on the primary amplitude values and determining a distance measure based on the actual phase properties, and providing an approximation of the distance based on a relationship between the primary and the secondary amplitude values.

The level gauging thus includes an approximation of a distance to the surface. The approximation is determined by relating an amplitude of a first harmonic of an IF signal with an amplitude of a second harmonic of the IF signal.

The frequency modulation of the transmit signal introduces a distance dependence. Two different harmonics of the modulated signal are used in two separate signal paths (sequential or parallel) to provide two different values representing different distance dependencies. By comparing these two values, e.g. dividing one with the other and forming a quotient between them, a rough approximation of the distance to the surface can be provided.

Basically, each harmonics represents a given distance range. By determining the received power in two or more harmonics, and correlating them to each other, the distance may be estimated. Depending on modulation and other parameters the distance dependence may be very different, and may be selected to suit the application.

The actual phase of the IF-signal of a plurality of pulses may be used in the process of providing a more exact distance measure, e.g. as disclosed in U.S. application Ser. No. 12/981,995, herewith incorporated by reference.

According to one approach, the approximated distance is used as input in the accurate distance determination, e.g. to improve the statistical analysis applied to a plurality of phase properties, thereby enabling a more sensitive and reliable distance measurement. Alternatively, the rough approximation can be used as a post processing verification of the accurate measurement. If the rough approximation is significantly different than the accurate distance measure, then a new accurate distance measurement should be obtained.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

In the present description, embodiments of the present invention are mainly described with reference to a radar level gauge system having a free propagating antenna for radiating and capturing electromagnetic signals. It should be noted that this by no means limits the scope of the invention, which is equally applicable to other signal propagating devices, including other free propagating antennas such as a rod antenna, a patch antenna, a fixed or movable parabolic antenna or a conical antenna, and wave guides, such as a still pipe, a transmission line or a probe, such as a single-line probe (including a so-called Goubau probe), a twin-line probe or a coaxial probe.

Figure 1:
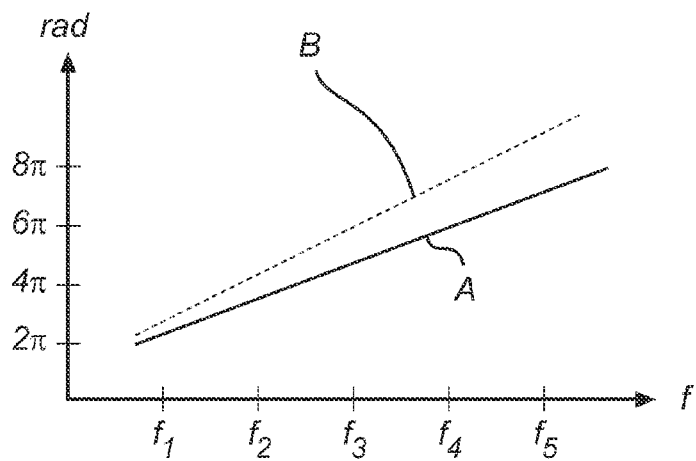
FIG. 1 is a diagram showing phase versus transmitted frequencies.
Figure 2:
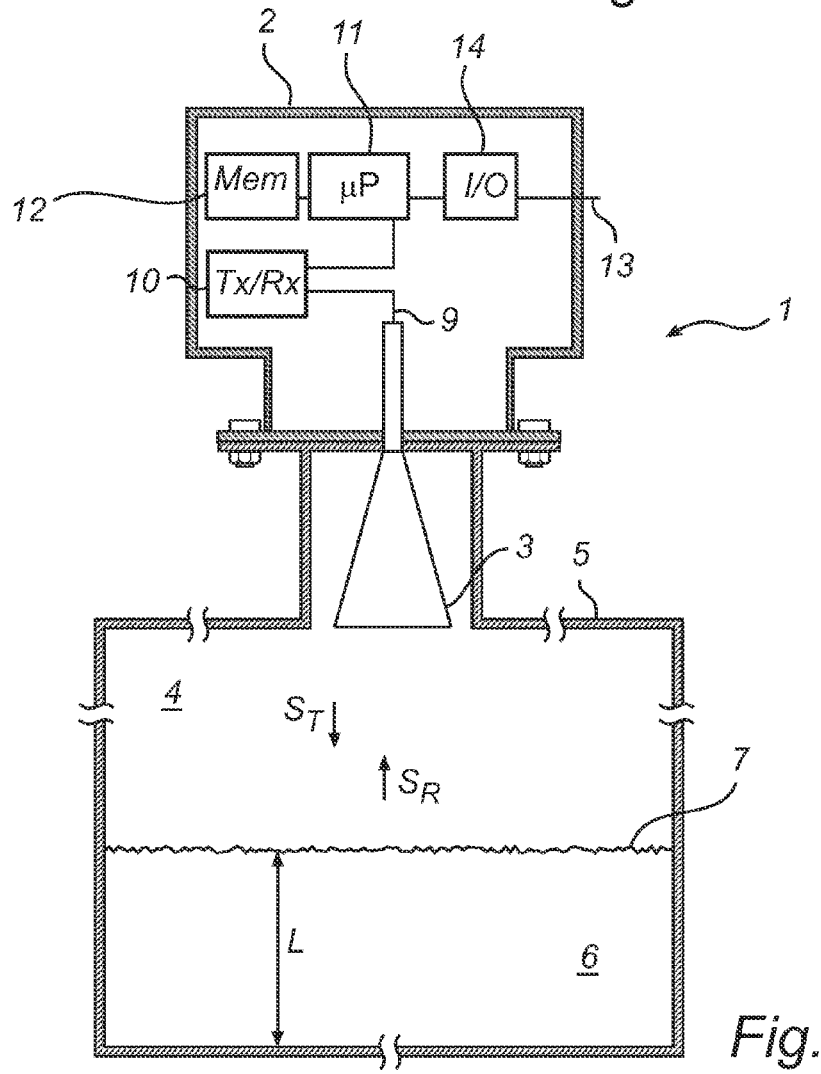
FIG. 2 is a schematic block diagram of a radar level gauge mounted on a tank.

FIG. 2 schematically illustrates a radar level gauge system 1 according to an embodiment of the present invention, comprising a measurement electronics unit 2, and a signal propagating device, here a horn antenna 3. The radar level gauge system 1 is provided on a tank 5, which is partly filled with a product 6 to be gauged. In the case illustrated in FIG. 1, the product 6 is a solid, such as grain or plastic pellets, which is well-known to represent a difficult application requiring a relatively high measurement sensitivity of the radar level gauge system. By analyzing transmitted signals $S_T$ being radiated by the antenna 3 towards the surface 7 of the product 6, and echo signals $S_R$ traveling back from the surface 7, the measurement electronics unit 2 can determine the distance between a reference position and the surface 7 of the product 6, whereby the filling level L can be deduced. It should be noted that, although a tank 5 containing a single product 6 is discussed herein, the distance to any material interface present in the tank 5 can be measured in a similar manner.

As is schematically illustrated in FIG. 2, the electronics unit 2 comprises a transceiver 10 for transmitting and receiving electromagnetic signals, which is connected to the antenna 3 via a wave guide 9. The unit 2 further comprises a processing circuitry 11, which is connected to the transceiver 10 for control of the transceiver and processing of signals received by the transceiver to determine the filling level of the product 6 in the tank 5. The processing circuitry 11 is also connected to a memory 12, storing any software required for the operation of the gauge 1, and also providing RAM used during operation.

The processing circuitry 11 is further connectable to external communication lines 13 for analog and/or digital communication via an interface 14. As an example, the communication between the communication interface 14 and an external control station (not shown) can be provided by a two-wire interface, which has a combined function of both transmitting the measurement result to the control station and receiving power for operation of the gauge 1. The current in the lines is regulated in accordance with a measurement result determined by the processing circuitry 11.

Alternatively, the gauge may communicate wirelessly with the control station using e.g. a Wireless HART protocol, and use a local power supply with batteries or other means of scavenging energy for autonomous operation.

Although being shown as separate blocks in FIG. 2, several of the transceiver 10, the processing circuitry 11 and the interface 12 may be provided on the same circuit board.

Figure 3:
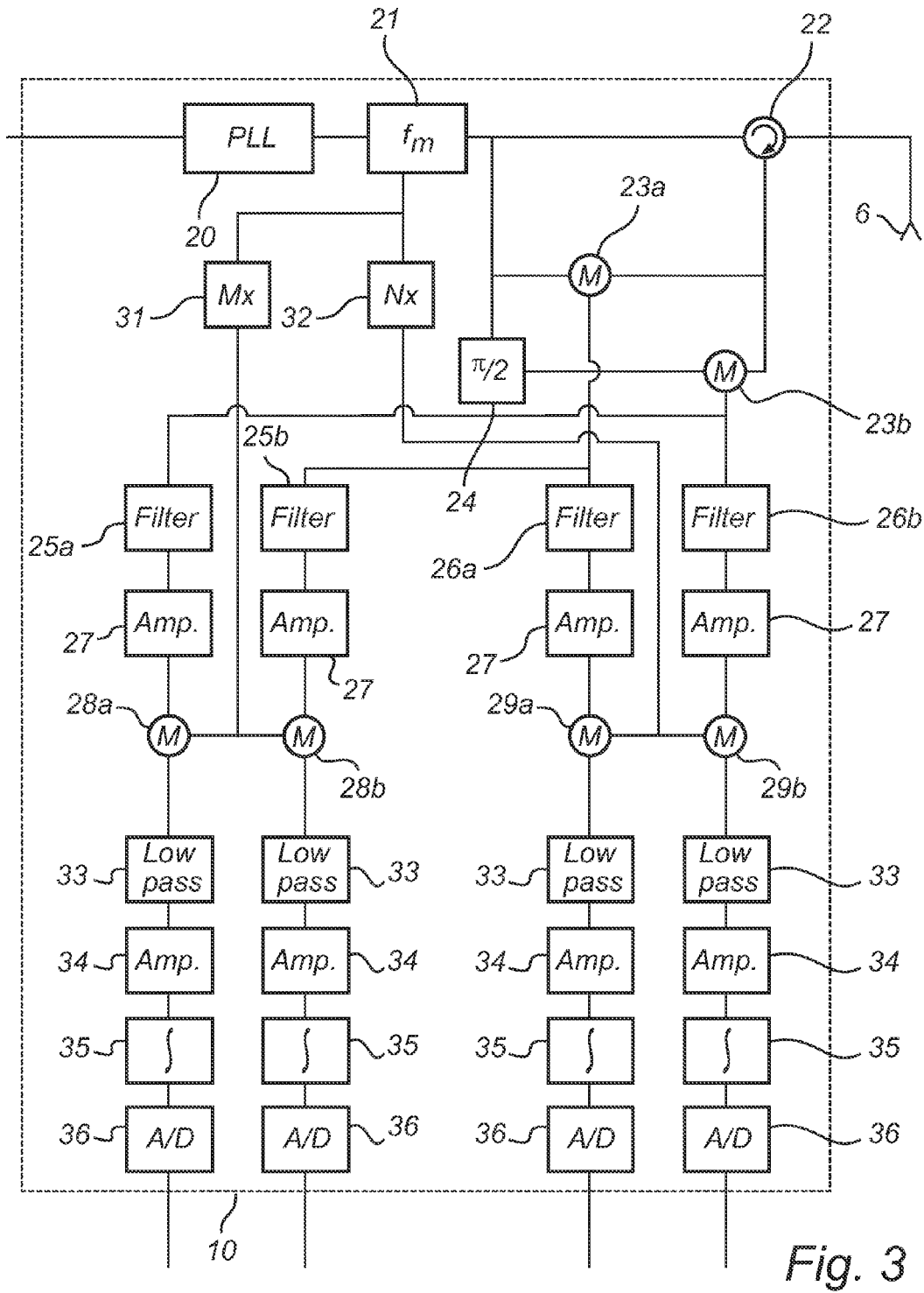
FIG. 3 is a more detailed block diagram of the transceiver in FIG. 1, according to a first embodiment of the present invention.

FIG. 3 schematically shows an exemplary transceiver 10 suitable for implementing an embodiment of the present invention.

A signal generator 20 is arranged to generate carrier wave pulses with a well defined and accurately controlled carrier frequency. The accuracy deviation should be less than $\frac{1}{1000}$, and preferably less than $\frac{1}{10000}$ or better. This may be achieved with a feed back control system, and the signal generator may for example include a phase locked loop, PLL.

In the illustrated example discussed herein, the pulse duration will be assumed to be about 2 ms, but significantly shorter pulses, e.g. in the order of μs are also possible. It should be noted that in a tank gauging context, pulses of a duration in the order μs or ms, as mentioned here, are much too long to enable pulsed distance measurement with time domain reflectometry, i.e. to receive a reflected pulse and determine its time of flight. The pulses according to the present invention are thus longer than pulses in conventional pulsed radar level gauges, where a typical pulse duration is in the order of ns.

The average power of the pulses can be in the nW or μW area. However, the duty cycle, i.e. the relationship between the pulses and the intervals there between, should be limited to less than 50%, and is preferably significantly lower, e.g. 5% or even 1% or less. Compared to conventional FMCW, this means that the pulses may be emitted with a relatively high power, without increasing the average power of the measurement cycle.

The pulses are typically radar pulses, with a carrier wave frequency in the GHz area. The frequency range may be in the order of 10% of the operating frequency, and may be e.g. between 25 and 27 GHz, or between 9.5 and 11 GHz. The number of frequencies N may preferably be determined based on the conditions prevalent in the tank. The duration of the pulses, the duty cycle, and the frequency of the PLL are controlled by the processor 11 (see FIG. 2).

The PLL 20 is connected to a modulator 21, arranged to frequency modulate the pulses from the PLL 20. The modulation can be of various types, including periodical (such as triangular or sinusoidal) or random (noise like). With a periodic modulation, an integer number of modulation periods is preferably contained within each emitted pulse, and the modulation preferably starts at a locked position (such as start at zero for each pulse). A random modulation is preferably pseudo-random.

Figure 6:
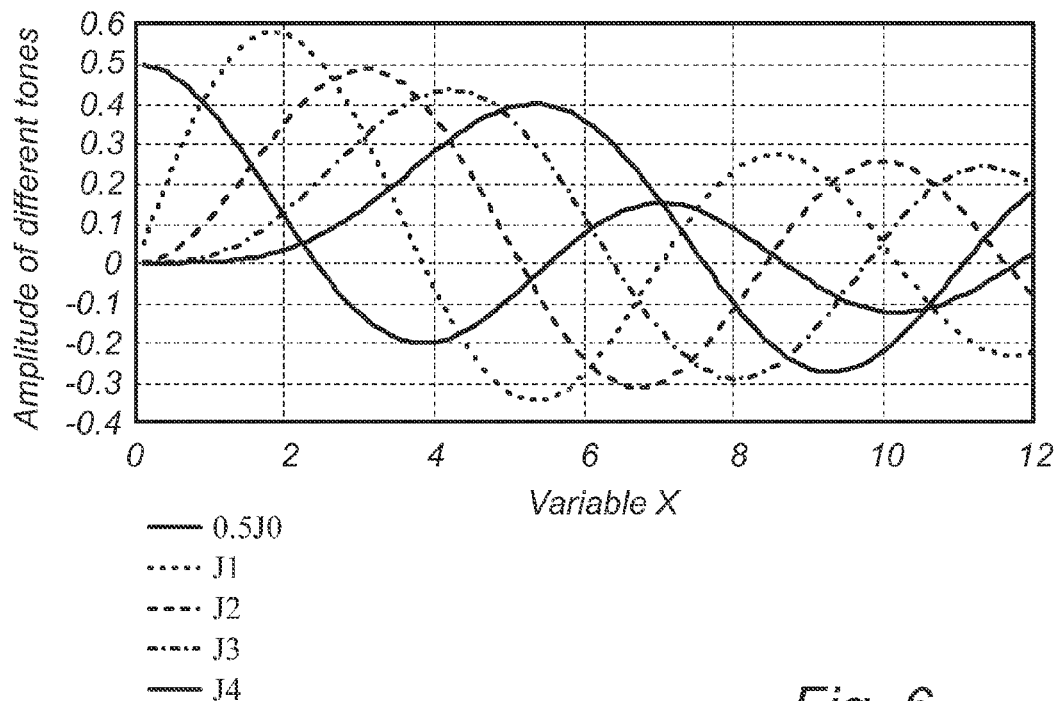
FIG. 6 shows the first five harmonics for sinusoidal modulation.

In the illustrated case, the modulation is assumed to be periodic, with a modulating frequency $f_m$. The frequency variation of the modulated carrier wave is shown in FIG. 6. The modulation frequency should be chosen with respect to the pulse duration to ensure that a complete number of modulation periods ($P_{mod}$) are included in each pulse. In the present example, where the pulse length is in the order of ms, the modulating frequency should be in the order of kHz, and may for example be 10 kHz. For a pulse duration in the range of 10 us to 100 ms, the modulating frequency may be in the order of a few kHz to one MHz.

Figure 4:
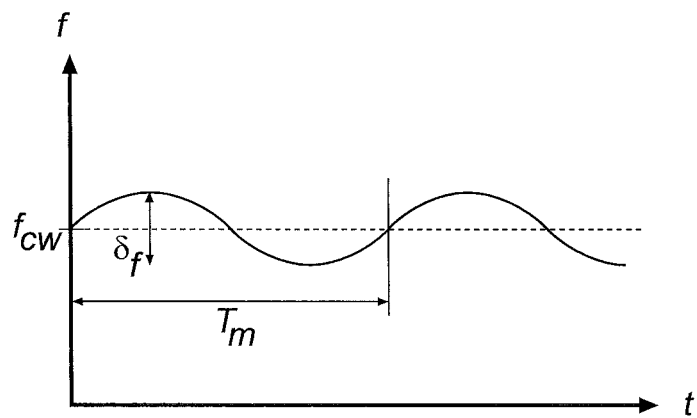
FIG. 4 illustrates frequency modulation of a carrier wave.

With reference to FIG. 4, the modulation has an amplitude selected to introduce a variation of the carrier wave frequency (modulation width) of δf, which is significantly smaller than the predetermined frequency range of the measurement. As mentioned, the predetermined range of carrier wave frequencies used in the frequency scheme may be in the order of 1 GHz, and the modulation width δf can then suitably be in the order of MHz.

A circulator 22, or a power divider such as a Wilkinson Power Divider (WPD), is provided to direct the signal from the signal modulator 21 to the antenna 3 in the tank 5 and to direct a return signal from the antenna 3 to a receiver section of the transceiver 10.

The receiver section comprises one or several RF mixers, for mixing the return signal with the transmit signal. The RF mixing may be homodyne mixing, i.e. the return signal is mixed directly with the transmit signal, but it may also be useful to apply mixing with a delayed transmit signal.

In the illustrated case, the receiver section includes two channels, an in-phase channel (I) and a quadrature channel (Q), each comprising a mixer 23a, 23b. The first mixer 23a is provided with the transmitted pulses directly from the PLL 20 (I-channel). The second mixer 23b is provided with the transmitted pulses from the PLL 20 via a 90 degrees phase shifter 24 (Q-channel) arranged between the modulator 21 and the mixer 23b.

The output from the mixers 23a, 23b will not be DC level signals, but instead be IF (intermediate frequency) signals including the modulation frequency $f_m$ and harmonics thereof. The receiver further comprises two sets of band pass filters 25a, 25b and 26a, 26b, respectively, each set being arranged to filter out a desired frequency content. The output from each RF mixer 23a, 23b is connected to one filter in each set, so that two different frequency contents (primary and secondary) are filtered out from each channel (I and Q). As discussed below, the desired content may be one of the first harmonics of $f_m$. The filtered signals are amplified by amplifiers 27.

Each set of filters is then connected to a set of IF mixers 28a, 28b, and 29a, 29b, respectively. These mixers also receive as input the modulation frequency $f_m$ from modulator 21, via two multipliers 31 and 32. The multiplier 31 is adapted to provide a multiple M of the modulation frequency $f_m$, corresponding to the harmonic that has been filtered out by filters 25a, 25b, while the multiplier 32 is adapted to provide a multiple N of the modulation frequency $f_m$, corresponding to the harmonic that has been filtered out by filters 26a, 26b. For example, if the first and second harmonics are selected, M=2 and N=3.

According to one embodiment, the filters 25a, 25b, 26a, 26b and multipliers 31, 32 are variable, to enable selection of desired frequency content. However, in some cases the filters 25a, 25b, 26a, 26b are determined by hardware, and not variable. In such a case, it is the modulator frequency $f_m$, modulating width δf, and factor N that are varied in order to achieve the desired filtering. The practical implementation of the filters may in most cases be digital and may be combined with the mixers.

The output from the mixers 25a, 25b, 26a, 26b will be DC level signals, representing primary and secondary phase values for each channel. These values are each fed to a sequence of processing elements including a low pass filter 33, an amplifier 34, an integrator 35 and an A/D converter 36.

The filters 33 and amplifiers 34 improve the signal-to-noise ratio of the radar level gauge system. The low pass filters 33 preferably have a bandwidth corresponding to the inverse of the pulse width. In other words, if the duration of the pulse is 2 ms, a suitable filter will be 500 Hz wide. Longer pulses can thus be used to increase the sensitivity (smaller bandwidth) at the expense of the average power. However, if a low duty cycle is desired, in order to achieve a low average power consumption, the pulses should be kept reasonable short, and the bandwidth of the low pass filters 33 must then be wider (with less sensitivity) than a conventional FMCW. The integrators 35 are adapted to integrate the signals over the length of the pulse.

The order of these elements (more specifically the placement of the A/D converter), will be governed by the choice of components, i.e. if they are analogue or digital components. The digital output is supplied to the processor 11 for storage and processing which will be described below.

It should also be noted that the topology of the transceiver illustrated in FIG. 3, with two parallel receiver channels (I and Q), each being divided into two parallel paths (N-filter and M-filter) is not to be viewed as limiting to the concept.

For example, an equally useful alternative may be to provide the primary and secondary phase values in a sequential fashion, i.e. having only one filter path for each channel, and alternating the settings of this path. In FIG. 3 that would mean that there would be only two sets of filters 25, 26, amplifiers 26, 27, mixers 28, 29, and processing elements 33-36, instead of four.

Indeed, a sequential approach may be used also for the RF mixing by mixers 23a, 23b, even further reducing the number of components, at the cost of increasing the number of pulses per measurement.

Depending on the type of frequency modulation introduced by the modulator 21 (sinusoidal, triangular, random, etc.) the IF signals output by mixers 23a, 23b will have a distance dependence and will be spread over different harmonics.

If the transmitted signal has a sinusoidal modulation with modulation width δf, the received signal after the homodyne mixing can be described by Bessel functions as harmonics of $f_m$ as illustrated in FIG. 6.

The argument in the Bessel functions is $X=2\pi h\delta f/c$, where h is the distance to the reflecting surface and c is the speed of light in vacuum. With increasing distance h (and thus increasing X) the received signal is spread over more harmonics. If, for example, the modulation width δf is 15 MHz and the distance h is 10 m, the argument X will be ~2.0 and most received signal will occur in $f_m$. The distance dependence of J1(X) (for X smaller than 2) has the same feature as the high-pass filtering in conventional FMCW-systems, i.e. to reduce the dynamic range ~20 dB by having an amplitude distance dependence counteracting the 1/h-dependence. If a fixed 6f is used it will be limited to 8-10 MHz to measure up to 20-25 m without losing too much amplitude by spreading power to too many other harmonics.

It is also possible to pick out the second tone, $2f_m$, which is more efficient to suppress close echoes and allows 12-15 MHz modulating width in applications to 20-25 m. The modulation width is adjustable depending on the used distance interval. Depending on the type of modulation it can either be different for different installations or be adjusted during the measurement.

An alternative to sinusoidal modulation is triangular frequency modulation which has different properties, and may be more efficient than sinusoidal modulation.

Figure 7:
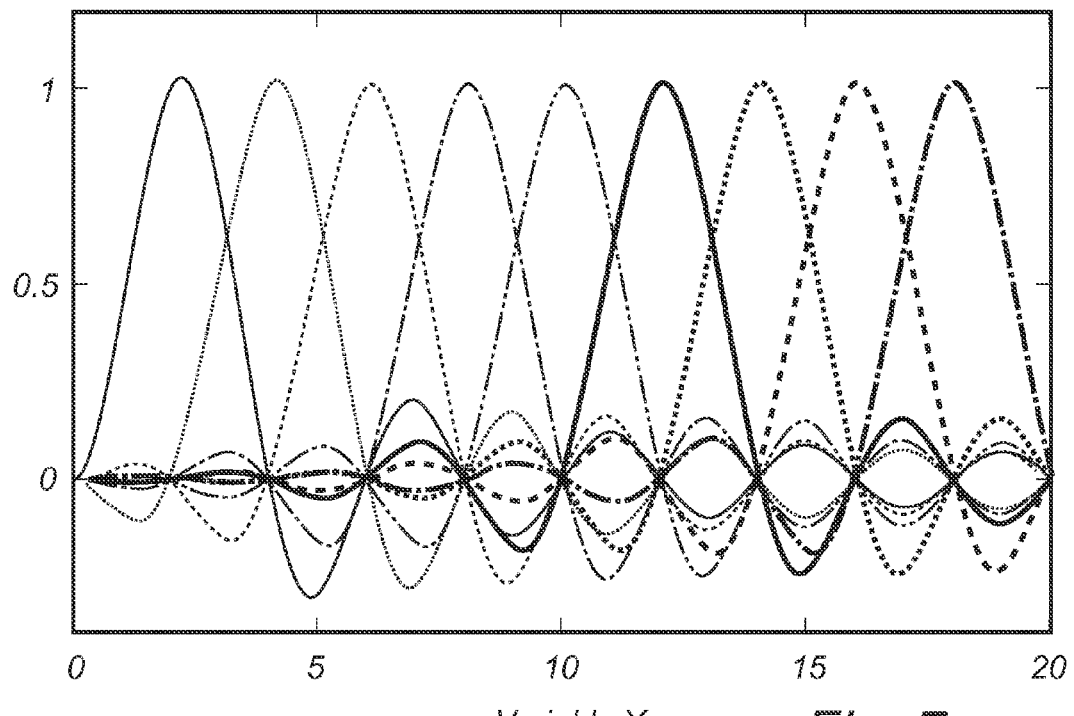
FIG. 7 shows Fourier coefficients for even tones for triangular modulation.

The resulting Fourier coefficients for the even harmonics ($2f_m$, $4f_m$, etc) at triangular modulation are shown in FIG. 7. The coefficients for 1, 3 etc. are very similar to those for 2, 4 etc., but with the peaks between the peaks for even harmonics. The peaks are all close to 1 so if the closest harmonic is filtered out nearly all signal power is used. The argument X is the same as above, so a wider δf may be used in the case of triangular modulation. At 50 MHz modulation width the full axis in the diagram above (0<x<20) corresponds to 0-30 m distance. With 50 MHz modulation width the spectral density can be reduced 17 dB without reducing the received signal. This reduction will remain also for long pulses. The lower spectral density for the same power may be used to increase the power.

By determining the amplitude of two different harmonics, in two separate processes, and comparing them with each other, a rough estimation of the distance may be provided. For example, in FIG. 6, it is clear that when the amplitude of the first two harmonics are the same (i.e. a quotient of 1) then X is slightly greater than 2. From a known value of X, the distance h can be calculated using the relationship above.

Figure 5:
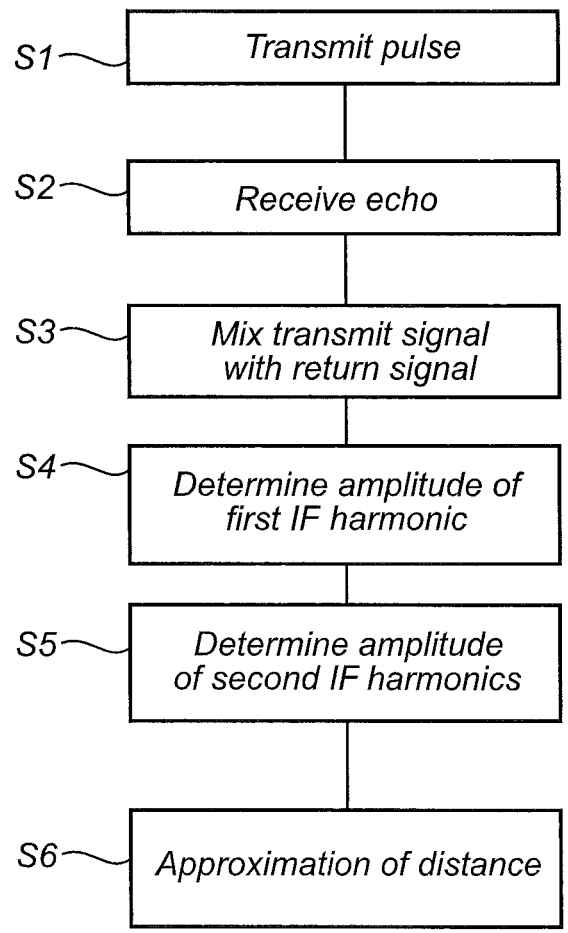
FIG. 5 is a flow chart of a method according to an embodiment of the present invention.

Operation of the radar level gauge illustrated in FIGS. 2 and 3, and in particular the process and in particular the process to provide a distance approximation, will be further described with reference to FIG. 5.

First, in step S1 a pulse of a determined duration, e.g. 2 ms, is generated by the PLL 20 and transmitted as signals ST into the tank by the antenna 3.

In step S2, the transmitted electromagnetic signals ST are reflected at impedance transitions in the tank 5, including the surface 7 of the product 6 contained in the tank 5, and are returned to the transceiver 10 as echo signals SR by the antenna 3. The return signal SR is received by the two channels (I and Q) in the receiver side of the transceiver 10.

In step S3, the return signal SR is mixed with the transmit signal in mixers 23a and/or 23b, to form an IF signals.

Then, in step S4-S5, amplitudes of two different harmonics of the IF signal are determined (in the illustrated example the processed output from mixers 28a and 29a, or alternatively from mixers 28b and 29b). Finally, in step S6 these two amplitudes are compared to each other to determine a rough distance approximation.

As explained above, one useful relationship is simply the quotient between the two amplitudes. Such a quotient may indicate a specific distance, based on knowledge of the distance dependence of the two harmonics.

It should further be noted that it may be advantageous to determine amplitudes for two or more different harmonics in each channel. For example, amplitudes for the first and third harmonics can be determined for one channel, and amplitudes for the second and fourth harmonics for the second channel. This may enable an even more robust approximation.

The distance approximation method outlined herein may advantageously be implemented in a radar level gauge adapted to operate according to the principles disclosed in U.S. Ser. No. 12/981,995.

According to that principle, the primary (or secondary) phase values discussed above are recorded in memory 13 for all frequencies in a predetermined frequency scheme. Each phase difference value (which is in the range 0-2π) is correlated to an expected phase difference value, calculated based on a previously detected distance. The difference between the expected phase and the actual, detected phase corresponds to a distance offset. In principle, one such offset, resulting from a single frequency, is sufficient to provide an updated distance detection. However, the uncertainty in such a detection will normally be too significant to provide satisfactory reliability, and some kind of statistical analysis will normally be required.

A rough approximation provided by the present invention, for each transmitted pulse, can be very advantageous to make such analysis more robust and reliable. Under certain conditions, this approximation may eliminate the need for an initial distance detection as discussed in U.S. Ser. No. 12/981,995.

Alternatively, or in combination, the approximation discussed herein may be used to verify a more accurate distance determination, e.g. obtained according to U.S. Ser. No. 12/981,995.

The person skilled in the art realizes that the present invention by no means is limited to the preferred embodiments described above. On the contrary, many modifications and variations are possible within the scope of the appended claims. For example, the principles of the present invention do not require I/O processing, but are in fact applicable also to a single channel system. Further, the details of the transceiver circuitry may be modified in a number of ways, without departing from the inventive concept.

What is claimed is:

1. A method of using a radar level gauging system to determine a distance to a surface of a product kept in a tank, said method comprising:
    forming a transmit signal as a pulse train of distinct carrier wave pulses having a duration greater than 1 microsecond and shorter than 100 milliseconds, each pulse being frequency modulated around a defined center frequency,
    transmitting said transmit signal towards said surface,
    receiving an electromagnetic return signal reflected at said surface,
    mixing the return signal with the transmit signal in a first channel (I-channel) and mixing the return signal with a 90° phase shifted transmit signal in a second channel (Q-channel), to provide two IF (intermediate frequency) signals, filtering said IF signals to provide a filtered signal corresponding to a first selected harmonic of said modulation frequency, mixing the filtered signals of each channel with said first selected harmonic of said modulation frequency, to provide two primary amplitude values (I and Q), calculating (step S5) by means of processing circuitry actual phase properties of each distinct pulse received in relation to each corresponding distinct pulse transmitted, based on said primary amplitude values and determining a distance measure based on said actual phase properties, filtering said IF signals to provide a filtered signal corresponding to a second selected harmonic of said modulation frequency, mixing the filtered signals of each channel with said second selected harmonic of said modulation frequency, to provide two secondary amplitude values (I and Q), and providing an approximation of said distance based on a relationship between said primary and said secondary amplitude values.

2. The method according to claim 1, wherein said relationship is a quotient between said primary and secondary amplitude values.

3. The method according to claim 1, wherein said approximation is used as input in a process to obtain a more accurate distance measure.

4. The method according to claim 1, wherein said approximation is used to verify a more accurate distance measure.

5. The method according to claim 1, further comprising frequency modulating each carrier wave pulse with a random modulation.

6. The method according to claim 1, further comprising frequency modulating each carrier wave pulse with a periodic modulation having a modulation frequency.

7. The method according to claim 6, wherein the frequency modulation is one of sinusoidal and triangular.

8. The method according to claim 6, wherein the modulation frequency is in the range 10 kHz-100 kHz.

9. The method according to claim 6, wherein the modulation introduces a variation of the carrier frequency in the range 1 MHz-100 MHz.

10. The method according to claim 1, further comprising accurately determining said distance by:

determining, based on an initially estimated distance, expected phase properties of each received distinct pulse in relation to each corresponding transmitted distinct pulse, and correlating said actual phase properties with said expected phase properties to provide an updated estimation of said distance.

11. The method according to claim 10, wherein said correlating includes:

determining a distance offset of said distance based on said actual phase properties and said expected phase properties, and determining said updated estimation of said distance based on said initially estimated distance and said distance offset.

12. The method according to claim 1, wherein the center frequency of each pulse is selected according to a frequency scheme within a predetermined frequency range.

13. The method according to claim 1, wherein each carrier wave frequency is controlled in a fed-back control loop providing a frequency accuracy deviation less than $1/1000$.

14. The method according to claim 12, wherein said predetermined frequency range is greater than 5% of an average center frequency.

15. The method according to claim 12, wherein said predetermined frequency range is greater than 10% of an average center frequency.

16. The method according to claim 1, wherein said pulse train has an average duty cycle of less than 50 percent.

17. The method according to claim 16, wherein said duty cycle is less than 5%.

18. A radar level gauging system, for determining a distance to a surface of a product kept in a tank, said system comprising:

a transceiver for transmitting electromagnetic transmit signals formed by a pulse train of distinct carrier wave pulses having a duration greater than 1 microsecond and shorter than 100 milliseconds, each pulse being frequency modulated around a defined center frequency, and receiving electromagnetic return signals reflected at said surface, a set of RF mixers for mixing the return signal with the transmit signal in a first channel (I-channel) and mixing the return signal with a 90° phase shifted transmit signal in a second channel (Q-channel), to provide two IF (intermediate frequency) signals, a first set of filters for filtering said IF signals to provide a filtered signal corresponding to a first selected harmonic of said modulation frequency, a first set of IF mixers for mixing the filtered signals of each channel with said first selected harmonic of said modulation frequency, to provide two primary amplitude values (I and Q), a second set of filters for filtering said IF signals to provide a filtered signal corresponding to a second selected harmonic of said modulation frequency, a second set of IF mixers for mixing the filtered signals of each channel with said second selected harmonic of said modulation frequency, to provide two secondary amplitude values (I and Q), and processing circuitry connected to receive outputs from said IF mixers and operable to:

calculate actual phase properties of each distinct pulse received in relation to each corresponding distinct pulse transmitted, based on said primary amplitude values and determining a distance measure based on said actual phase properties, and providing an approximation of said distance based on a relationship between said primary and said secondary amplitude values.

19. The system according to claim 18, wherein said transceiver is configured to frequency modulate each carrier wave pulse with a random modulation.

20. The system according to claim 18, wherein said transceiver is configured to frequency modulate each carrier wave pulse with a periodic modulation having a modulation frequency.

21. The system according to claim 20, wherein the frequency modulation is one of sinusoidal and triangular.

22. The system according to claim 18, wherein said transceiver incldues a fed-back control loop providing a frequency accuracy deviation less than $1/1000$.

23. The system according to claim 18, wherein the transceiver is configured to select the center frequency of each pulse according to a frequency scheme within a predetermined frequency range.

24. The system according to claim 23, wherein said transceiver is configured to said predetermined frequency range is greater than 10% of an average center frequency.

25. The system according to claim 18, wherein the transceiver is configured to control a duty cycle of said pulse train to be less than 50 percent.

26. The system according to claim 25, wherein the transceiver is configured to control a duty cycle of said pulse train to be less than 5 percent.

* * * * *